United States Patent
Jung et al.

(10) Patent No.: US 7,212,246 B2
(45) Date of Patent: May 1, 2007

(54) IMAGE SIGNAL FORMAT DETECTION APPARATUS AND METHOD

(75) Inventors: You-young Jung, Suwon (KR); Young-ho Lee, Seoul (KR); Seung-joon Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 437 days.

(21) Appl. No.: 10/714,605

(22) Filed: Nov. 18, 2003

(65) Prior Publication Data

US 2004/0114048 A1    Jun. 17, 2004

(30) Foreign Application Priority Data

Dec. 16, 2002   (KR)   ...................... 10-2002-0080504

(51) Int. Cl.
    *H04N 7/01*   (2006.01)
(52) U.S. Cl. ........................ 348/448; 348/449; 348/558
(58) Field of Classification Search ................ 348/448, 348/449, 452, 458, 558, 451; *H04N 7/01*
    See application file for complete search history.

(56) References Cited

U.S. PATENT DOCUMENTS

| | | | |
|---|---|---|---|
| 4,731,651 A | 3/1988 | Matsumoto et al. | |
| 5,111,511 A | 5/1992 | Ishii et al. | |
| 5,153,719 A | 10/1992 | Ibenthal | |
| 5,398,071 A | 3/1995 | Gove et al. | |
| 5,400,083 A | 3/1995 | Mizusawa | |
| 5,568,196 A | 10/1996 | Hamada et al. | |
| 5,796,437 A | 8/1998 | Muraji et al. | |
| 5,844,630 A | 12/1998 | Yamauchi | |
| 5,982,444 A * | 11/1999 | Kato et al. | .................. 348/446 |

(Continued)

FOREIGN PATENT DOCUMENTS

EP    0 883 298 A    12/1998

(Continued)

OTHER PUBLICATIONS

Chinese Office Action for Application No. 200310116599.7 dated Sep. 30, 2005.

(Continued)

*Primary Examiner*—Michael H. Lee
(74) *Attorney, Agent, or Firm*—Staas & Halsey LLP

(57) ABSTRACT

An image signal format detection apparatus and method. The image signal format detection apparatus includes a first summed absolute difference (SAD) value calculation unit for calculating, from a previous field, a current field, and a next field of a time-consecutive image signal, a first SAD value with reference to pixel values of the current field and the previous field. A second SAD value calculation unit calculates a second SAD value with reference to pixel values of the current field and the next field. A pattern generation unit generates a detection pattern based on a result of a comparison of the first and second SAD values,; and a pattern analysis unit stores the detection pattern by field, compares the stored detection pattern of a series of fields with a predetermined verification pattern, and determines whether the image signal is an image signal produced in 2:2 pull-down. The apparatus detects an image signal produced in 2:2 pull-down by using the SAD values between fields, and can be applied to a deinterlacing device or the like.

15 Claims, 4 Drawing Sheets

U.S. PATENT DOCUMENTS

| | | | |
|---|---|---|---|
| 5,995,154 A | 11/1999 | Heimberger et al. | |
| 6,014,182 A | 1/2000 | Swartz | |
| 6,058,140 A | 5/2000 | Smolenski | |
| 6,061,100 A | 5/2000 | Ward et al. | |
| 6,108,041 A | 8/2000 | Faroudja et al. | |
| 6,201,577 B1 | 3/2001 | Swartz | |
| 6,297,848 B1 | 10/2001 | Westerman | |
| 6,370,198 B1 | 4/2002 | Washino | |
| 6,559,890 B1 | 5/2003 | Holland et al. | |
| 6,580,463 B2 | 6/2003 | Swartz | |
| 6,700,622 B2 * | 3/2004 | Adams et al. | 348/448 |
| 6,757,022 B2 | 6/2004 | Wredenhagen et al. | |
| 6,891,571 B2 | 5/2005 | Shin et al. | |
| 6,937,655 B2 | 8/2005 | De Haan et al. | |
| 6,989,845 B1 | 1/2006 | Okamoto et al. | |
| 2002/0149703 A1 | 10/2002 | Adams et al. | |
| 2003/0189667 A1* | 10/2003 | Chow | 348/441 |

FOREIGN PATENT DOCUMENTS

| | | |
|---|---|---|
| EP | 1 091 580 | 4/2001 |
| EP | 1 100 267 | 5/2001 |
| EP | 1 168 842 | 1/2002 |
| EP | 1 198 137 A | 4/2002 |
| EP | 1 198 139 | 4/2002 |
| GB | 2 258 580 | 2/1993 |
| JP | 03-280681 | 12/1991 |
| JP | 04-137892 | 5/1992 |
| JP | 07-288780 | 10/1995 |
| JP | 2001-028735 | 1/2001 |
| JP | 2002-016944 | 1/2002 |
| JP | 2002-57993 | 2/2002 |
| KR | 2001-90568 | 10/2001 |
| KR | 2001-2659 | 1/2002 |
| WO | WO 95/24100 | 9/1995 |
| WO | 00/16561 | 3/2000 |

OTHER PUBLICATIONS

U.S. Appl. No. 10/704,663, filed Nov. 12, 2003, Lee et al.
U.S. Appl. No. 10/695,169, filed Oct. 29, 2003, You-Young, Jung.
U.S. Appl. No. 10/438,210, filed May 15, 2003, Yang et al.
European Search Report for European Office Application No. 03026725.6.
Translation of JP 2002-016944 (Detailed Description part).
German Office Action for German Application No. 10331048.7.
Japanese Office Action for Japanese Application No. 2003-423610.

* cited by examiner

IMAGE SIGNAL FORMAT DETECTION APPARATUS AND METHOD

CROSS-REFERENCE TO RELATED APPLICATIONS

This application claims the benefit of Korean Patent Application Nos. 2002-80504, filed on Dec. 16, 2002, in the Korean Intellectual Property Office, the disclosure of which is incorporated herein in its entirety by reference.

BACKGROUND OF THE INVENTION

1. Field of the Invention

The present invention relates to an image signal format detection apparatus and method, and more particularly, to an image signal format detection apparatus and method capable of detecting images converted from progressive format images to interlace format images by an application of a 2:2 pull-down algorithm.

2. Description of the Related Art

In general, an image display device employs either an interlace scan mode or a progressive scan mode. The interlace scan mode is used for general TVs and the like, and includes a division of one image frame into two fields and a display of the fields on a screen one after the other, in order, when displaying one image. At this time, the two fields are referred to as a top field and bottom field, an upper field and lower field, an odd field or even field, and so on. On the other hand, the progressive scan or non-interlace scan mode is used for computer monitors, digital TVs, and so on, and includes a display of an entire frame image, all at once, by dealing with one image frame, as a frame unit, e.g., film being displayed on a screen.

For example, in case of 480-line National Television System Committee (NTSC) interlace scan mode (precisely, 487 valid lines in 525 lines), one frame is divided into two 240-line fields for display, and the divided 240-line fields, as noted above, are displayed on a screen one after the other every 1/60 seconds (480/60 i). On the other hand, the progressive scan mode completely displays the entire frame image, e.g., a 480-line image, all at once every 1/60 seconds (480/60 p). Accordingly, a progressive format image based on the progressive scan mode has a better image quality compared to an interlace format image.

One of the typical video formats that is closely related to such a progressive scan mode is a DVD movie formatted for display on an analog television and initially produced on film, since the original sources for almost all DVD movie titles released in recent years are produced on film first. Movies are produced at 24 frames per second, differently from NTSC TV programs. In the case of a DVD movie, it is, of course, possible to directly manufacture a DVD including the original images of 24 frames, as in an original film movie. However, since a majority of image display devices, such as general analog televisions, at present adopt the interlace scan mode, it is more practical to produce DVD movie titles in the interlace scan mode.

Accordingly, a process is required for converting a 24-frame progressive film into 60-field interlace images, which is typically referred to as a 3:2 pull-down or a "telecine." The 3:2 pull-down process is a process that converts two 24 Hz frames into five 60 Hz fields, producing three fields repeatedly from the first frame and two fields from the second frame.

Meanwhile, 30-frame-per-second progressive format images are typically used for advertisement broadcasts, music videos, or the like, for which a 2:2 pull-down, similar to the 3:2 pull-down, is used. That is, the 2:2 pull-down refers to a process for converting 30-frame progressive format film into 60-field interlace format images.

FIG. 1 illustrates the 2:2 pull-down. In FIG. 1, images produced in the 30-frame-per-second progressive format are converted into the 60 Hz interlace format by dividing each frame into two fields. For example, a Frame 1 is converted into two fields T1 and B1, and a Frame 2 into two fields T2 and B2, and so on.

However, as it has become more necessary to exchange data among devices using different scan modes as the use of image display devices employing the progressive scan mode increases, an interlaced-to-progressive conversion (IPC) method becomes necessary to convert the interlace scan mode into the progressive scan mode. During such an IPC process, if it is known that a currently input image is a 2:2 pull-down-converted image, a complete progressive format image before the 2:2 pull-down can be easily obtained merely by combining interlace format fields. Accordingly, before implementing the IPC method, it becomes necessary to detect whether a field to be interpolated is for a previously 2:2 pull-down converted image.

Conventional systems mainly use the 3:2 pull-down, and conventional technologies have been disclosed, especially, in U.S. Pat. No. 5,398,071 entitled "Film To Video Format Detection For Digital Television" for methods for detecting such 3:2 pull-down format images. However, few or no technologies have been known to detect 2:2 pull-down format images through a relatively simple structure. Therefore, an image signal format detection apparatus and method is desired to detect the 2:2 pull-down format through a relatively simple structure.

SUMMARY OF THE INVENTION

The present invention has been devised to solve the above and/or other problems, so it is an aspect of the present invention to provide an image format detection apparatus and method capable of detecting whether an image was previously generated by a 2:2 pull-down image format, through a relatively simple structure.

Additional aspects and/or advantages of the invention will be set forth in part in the description which follows and, in part, will be obvious from the description, or may be learned by practice of the invention.

To achieve the above and/or other aspects of the present invention, there is provided an image signal format detection apparatus, including a first summed absolute difference (SAD) value calculation unit to calculate, from a previous field, a current field, and a next field of an image signal with time-consecutive fields, a first SAD value with reference to pixel values of the current field and the previous field, a second SAD value calculation unit to calculate a second SAD value with reference to pixel values of the current field and the next field, a pattern generation unit to generate a detection pattern based on a result of a comparison of the first and the second SAD values, and a pattern analysis unit to store the detection pattern, compare the stored detection pattern with a predetermined verification pattern, and determine whether the image signal is an image signal generated by a 2:2 pull-down.

To achieve the above and/or other aspects of the present invention, there is provided a deinterlacing apparatus for converting an interlace scan mode image signal into a progressive scan mode image signal, including the above format detection unit, a 2:2 pull-down compensation unit, and an interlace-to-progressive conversion unit, wherein the input image to the deinterlacing apparatus is selectively deinterlaced by the deinterlacing apparatus based either on the 2:2 pull-down compensation unit or the interlace-to-progressive conversion unit based on an output of the format detection unit.

To achieve the above and/or other aspects of the present invention, there is provided an image signal format detection method, calculating, from a previous field, a current field, and a next field of a time-consecutive image signal, a first summed absolute difference (SAD) value with reference to pixel values of the current field and the previous field, calculating a second SAD value with reference to pixel values of the current field and the next field, generating a detection pattern based on a result of a comparison of the first and second SAD values, and storing the detection pattern, comparing the stored detection pattern with a predetermined verification pattern, and determining whether the image signal is an image signal generated by a 2:2 pull-down.

To achieve the above and/or other aspects of the present invention, there is provided a deinterlacing method for converting an interlace scan mode image signal into a progressive scan mode image signal, including outputting a deinterlaced image signal selectively based on interpolation values from either a 2:2 pull-down compensation operation or an interlace-to progressive conversion operation based on the above image signal format detection method.

To achieve the above and/or other aspects of the present invention, there is provided a deinterlacing apparatus for converting an interlace scan mode image signal into a progressive scan mode image signal, including a format detection unit to detect a format of an input image based on a comparison of summed absolute difference values between fields of the input image, a 2:2 pull-down compensation unit, and an interlace-to-progressive conversion unit, wherein the input image to the deinterlacing apparatus is selectively deinterlaced by the deinterlacing apparatus based either on the 2:2 pull-down compensation unit or the interlace-to-progressive conversion unit based on an output of the format detection unit.

The comparison of the summed absolute difference values between fields of the input image can be based on a comparison of the result of the following two equations:

$$\sum_{i=0}^{M-1}\sum_{j=0}^{N-1}|f_{n-1}(i, j) - f_n(i, j)|; \text{ and}$$

$$\sum_{i=0}^{M-1}\sum_{j=0}^{N-1}|f_n(i, j) - f_{n+1}(i, j)|,$$

wherein $f_{n-1}(i,j)$ denotes a value of a pixel at row i and column j in a previous field, $f_n(i,j)$ denotes a value of a pixel at row i and column j in a current field, and $f_{n+1}(i,j)$ denotes a value of a pixel at row i and column j in a next field, with M−1 and N−1 denoting maximum values of i and j, respectively, for an image of M×N size.

BRIEF DESCRIPTION OF THE DRAWINGS

The above and/or other aspects and advantages of the present invention will become and more readily appreciated from the following description of the embodiments taken in conjunction with the accompanying drawings in which.

DETAILED DESCRIPTION OF THE PREFERRED EMBODIMENT

Figure 1:
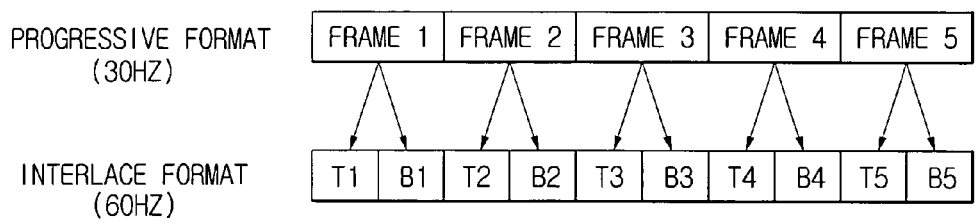
FIG. 1 illustrates a conventional 2:2 pull-down-method.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 2:
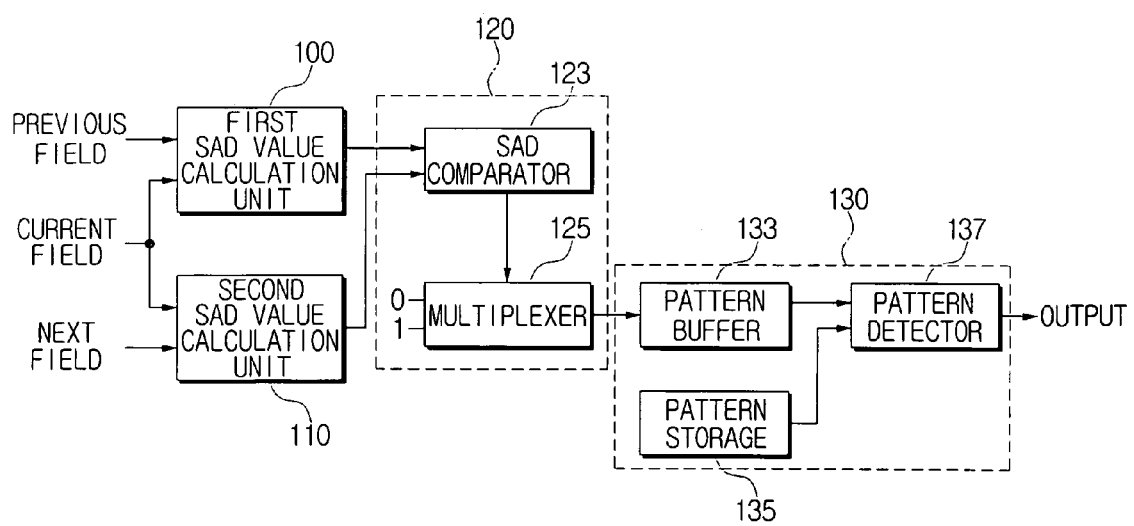
FIG. 2 illustrates an image signal format detection apparatus, according to an embodiment of the present invention.

FIG. 2 is a block diagram illustrating an image signal format detection apparatus, according to an embodiment of the present invention. The image signal format detection apparatus includes first and second summed absolute difference (SAD) value calculation units 100 and 110, a pattern generation unit 120, and a pattern analysis unit 130. The pattern generation unit 120 includes a SAD comparator 123 and a multiplexer 125, and the pattern analysis unit 130 includes a pattern buffer 133, a pattern storage 135, and a pattern detector 137.

The first and second SAD value calculation units 100 and 110 input an image signal formed with plural fields, consecutive in time. At this time, a currently input field is referred to as a current field, and fields ahead of and behind the current field are referred to as a previous field and a next field, respectively. The first SAD value calculation unit 100 calculates a first SAD value with reference to pixel values of the current field and the previous field. The second SAD value calculation unit 110 calculates a second SAD value with reference to pixel values of the current field and the next field.

The pattern generation unit 120 compares the first and second SAD values calculated in the first and second SAD value calculation units 100 and 110, and generates a detection pattern based on a result of the comparison. The pattern analysis unit 130 stores the detection pattern generated by the pattern generation unit 120, compares a predetermined pre-stored verification pattern with a series of stored detection patterns, and decides whether the inputted image signal is a 2:2 pull-down format image generated by a 2:2 pull-down. A stored detection pattern may similarly be generated by sequentially incorporating the output of the comparison, of the first and second SAD values, in a single pattern, e.g., a series.

Figure 3:
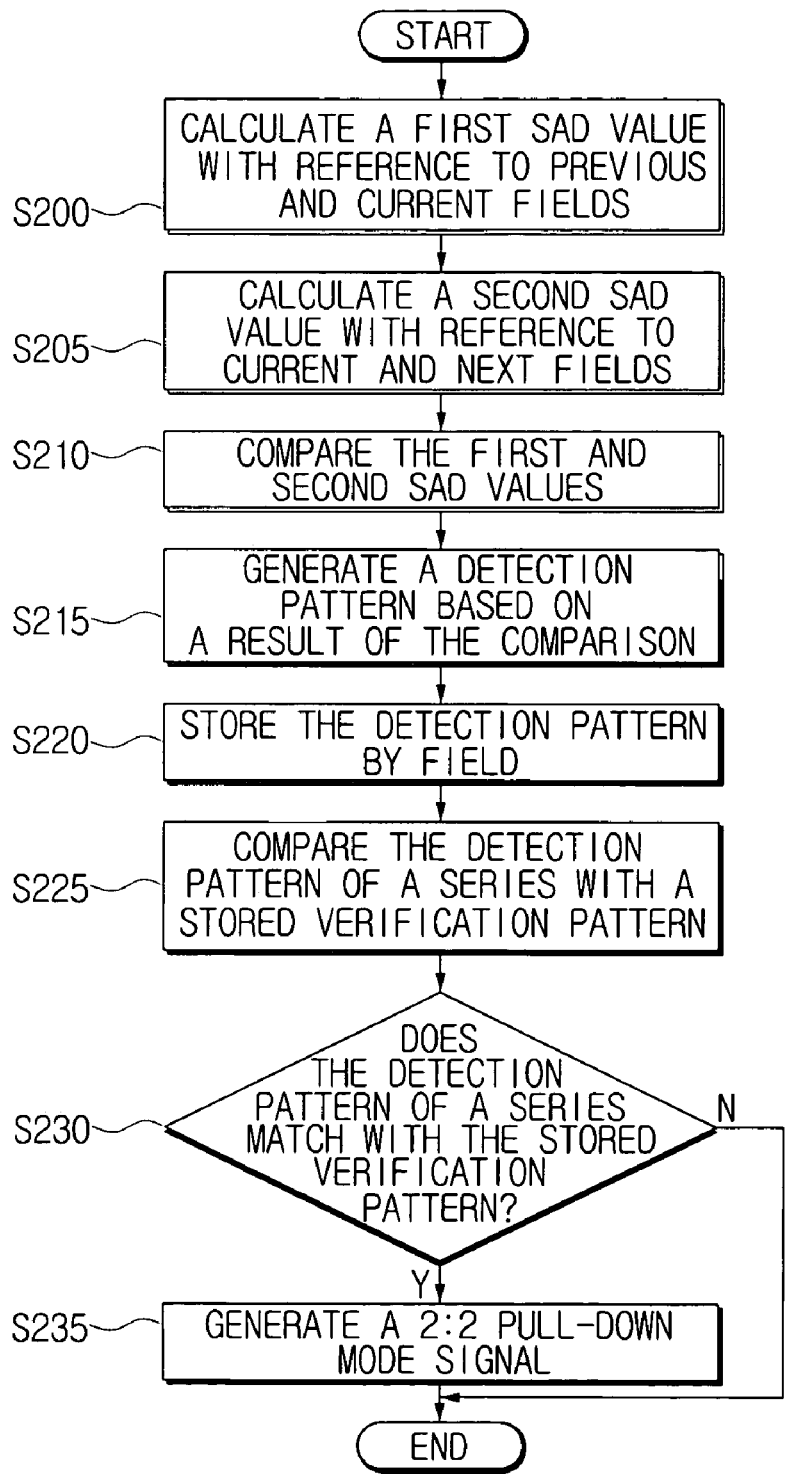
FIG. 3 is a flow chart of an operation of an image signal format detection apparatus, according to an embodiment of the present invention.

FIG. 3 is a flow chart of operations of an image signal format detection apparatus, according to an embodiment of the present invention. Referring to the flow chart of FIG. 3, first, the first SAD value calculation unit 100 calculates a first SAD value with reference to pixel values of a previous field and a current field (S200). Further, the second SAD value calculation unit 110 calculates a second SAD value with reference to pixel values of the current field and a next field (S205). At this time, the first and second SAD value calculation units 100 and 110 calculate the first and second SAD values by the following equations:

$$\text{First SAD value} = \overset{M-1}{\underset{i=0}{Q}} \overset{N-1}{\underset{j=0}{Q}} |f_{n-1}(i,j) - f_n(i,j)|$$

$$\text{Second SAD value} = \overset{M-1}{\underset{i=0}{Q}} \overset{N-1}{\underset{j=0}{Q}} |f_n(i,j) - f_{n+1}(i,j)|$$

$f_{n-1}(i,j)$ denotes a value of a pixel at row i and column j in a previous field, $f_n(i,j)$ denotes a value of a pixel at row i and column j in a current field, and $f_{n+1}(i,j)$ denotes a value of a pixel at row i and column j in a next field. Further, M−1 and N−1 denote maximum values of i and j, respectively, that is, for an image of M×N size.

The SAD comparator 123 of the pattern generation unit 120 compares the magnitudes of the first and second SAD values calculated in the first and second SAD value calculation units 100 and 110 respectively (S210), and generates a detection result according to a result of the comparison (S215). The comparison of the first and second SAD values is carried out in the SAD comparator 123 of the pattern generation unit 120. The multiplexer 125, in the pattern generation unit 120, receives values of "1" and "0", respectively, and outputs either the input value of "1" or the value of "0" according to the controls of the SAD comparator 123. The value output from multiplexer 125 becomes a detection pattern.

Figure 4:
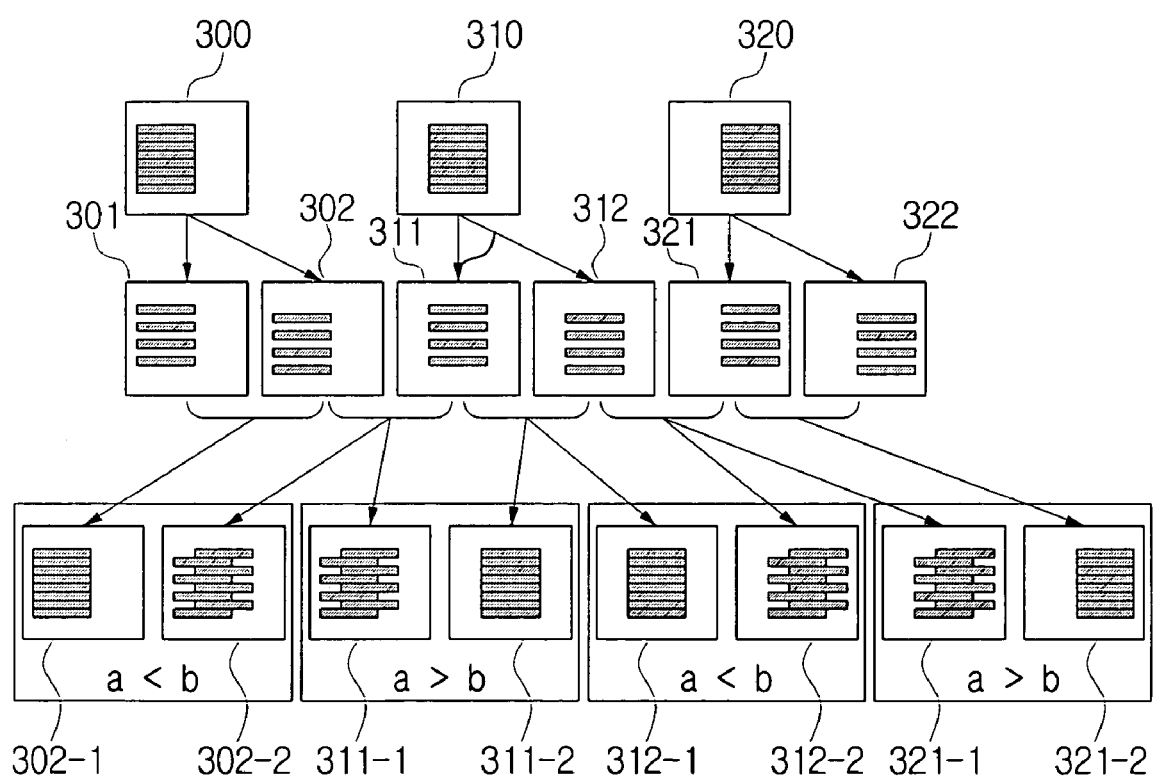
FIG. 4 illustrates a process for generating a detection pattern, according to an embodiment of the present invention.

FIG. 4 illustrates a process for generating a detection pattern, according to an embodiment of the present invention. Referring to FIG. 4, 30 Hz progressive format images 300, 310, and 320 are divided into two fields 301 and 302, 311 and 312, and 321 and 322, respectively, by a 2:2 pull-down. In this example, if a reference numeral 302 is a current field, a reference numeral 302-1 becomes a first SAD value calculated with reference to a previous field and the current field, and a reference numeral 302-2 becomes a second SAD value calculated with reference to the current field and a next field. Further, if a value "a" denotes the first SAD value and a value "b" denotes the second SAD value, the value a is smaller than the value b (a<b) since the previous field 301 and the current field 302 are fields divided from the same frame 300 and the current field 302 and the next field 311 are fields generated from different frames 300 and 301. With the multiplexer 125 outputting the value of "1" when a>b and the multiplexer 125 outputting the value of "0" when a<b, in the above example, the output value of the multiplexer 125 will be "0".

If the above process is carried out with respect to the fields 302, 311, 312, and 321, the values output from the multiplexer 125 become the series ". . . 0101 . . . ". Likewise, when the image is a 2:2 pull-down format image, the multiplexer 125 will repeatedly output values of "0" and "1."

The detection patterns output from the multiplexer 125 are stored in a pattern buffer 133. Accordingly, a value stored in the pattern buffer 133 becomes ". . . 0101 . . . " of certain length.

A detection pattern series of ". . . 0101 . . . " stored in the pattern buffer 133 is compared with a verification pattern stored in the pattern storage 135 (S225). The verification pattern stored in the pattern storage 135 is a pattern, for example, ". . . 0101 . . . ", of certain repetition period, based on the 2:2 pull-down.

It is then determined whether the series of ". . . 0101 . . . " of the detection pattern stored in the pattern buffer 133 matches with a verification pattern, for example, ". . . 0101 . . . ", stored in the pattern storage 135 (S230).

If the detection pattern, stored in the pattern buffer 133, matches with the verification pattern stored in the pattern storage 135, a 2:2 pull-down mode signal is generated (S230 and S235). Conversely, if the patterns do not match, it is decided that the detection pattern is not a 2:2 pull-down format image.

Through the above process, it can be determined whether an input field is a 2:2 pull-down format field produced by the 2:2 pull-down. Such an image signal format detection apparatus can, accordingly, be applied to an IPC process and the like.

Figure 5:
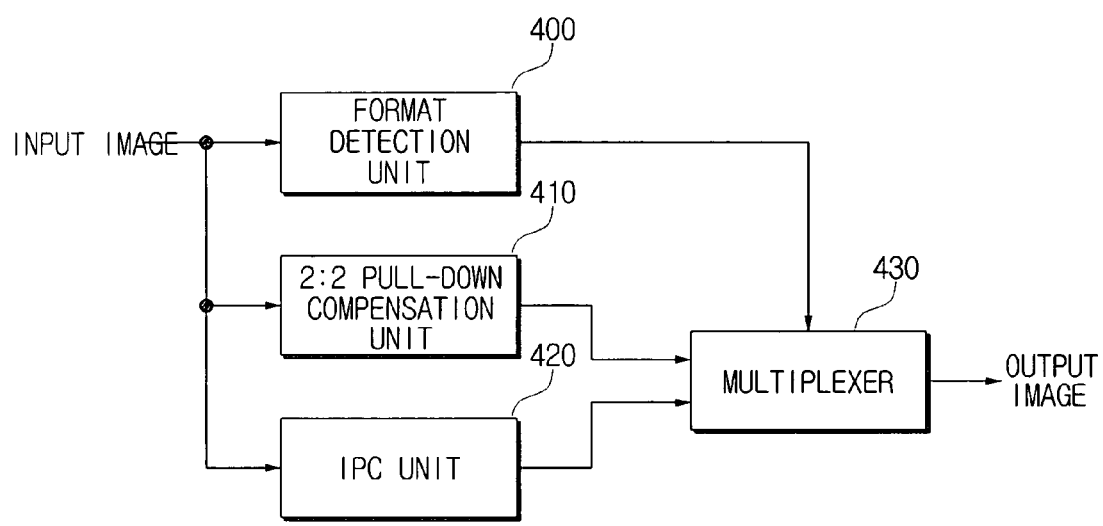
FIG. 5 illustrates an exemplary deinterlacing apparatus, using an image signal format detection apparatus, according to an embodiment of the present invention.

FIG. 5 illustrates an exemplary deinterlacing apparatus using an image signal format detection apparatus, according to an embodiment of the present invention. A deinterlacing apparatus refers to an apparatus for converting an interlace scan mode image signal into a progressive scan mode image signal. The interlacing apparatus shown in FIG. 5 includes a format detection unit 400, a 2:2 pull-down compensation unit 410, an IPC unit 420, and a multiplexer 430.

The format detection unit 400, through one of the above processes, e.g., described in FIG. 3 and FIG. 4, detects whether an input image field is a field produced by a 2:2 poll-down. The 2:2 pull-down compensation unit 410 assumes that the input image is a 2:2 pull-down image, and outputs interpolation values based on that assumption. The IPC unit 420 outputs interpolated values by using an appropriate interpolation method such as motion-compensated interpolation method or the like. The multiplexer 430 outputs, as final interpolation values, interpolation values of either the 2:2 pull-down compensation unit 410 or the IPC unit 420, by a 2:2 pull-down mode signal output from the format detection unit 400. Accordingly, if the input image is a 2:2 pull-down image, values interpolated by the 2:2 pull-down compensation unit 410 are used. Otherwise, the interpolation values outputted from the IPC unit 420 are used, thereby enabling good quality images to be effectively obtained.

As described above, the present invention can detect whether an input image is an image produced by a 2:2 pull-down, based on SAD values between fields. Further, the image signal format detection apparatus and method according to the present invention can be easily implemented due to a relatively simple structure. Such image signal format detection apparatuses and methods can be applied to interlaced-to-progressive conversion (IPC) methods or the like, enabling good quality images to be effectively obtained.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image signal format detection apparatus, comprising:
    a first summed absolute difference (SAD) value calculation unit to calculate, from a previous field, a current field, and a next field of an image signal with time-consecutive fields, a first SAD value with reference to pixel values of the current field and the previous field;
    a second SAD value calculation unit to calculate a second SAD value with reference to pixel values of the current field and the next field;

a pattern generation unit to generate a detection pattern based on a result of a comparison of the first and the second SAD values; and a pattern analysis unit to store the detection pattern, compare the stored detection pattern of with a predetermined verification pattern, and determine whether the image signal is an image signal generated by a 2:2 pull-down, wherein the pattern generation unit comprises:

a SAD comparator to compare magnitudes of the first and the second SAD values; and a multiplexer to selectively output either a corresponding first value or second value based on a result of the comparison of the SAD comparator.

2. The image signal format detection apparatus of claim 1 wherein when the first value is "0" the second value is "1".

3. The image signal format detection apparatus of claim 1, wherein the pattern analysis unit comprises:

a pattern buffer to sequentially store the detection pattern;

a pattern storage to store the predetermined verification pattern; and a pattern detection unit to compare the detection pattern stored in the pattern buffer and the verification pattern stored in the pattern storage.

4. The image signal format detection apparatus of claim 3, wherein the predetermined verification pattern is a pattern having a predetermined repetition period according to the 2:2 pull-down.

5. The image signal format detection apparatus of claim 1, wherein the detection pattern is a series.

6. An image signal format detection method, comprising:

calculating, from a previous field, a current field, and a next field of a time-consecutive image signal, a first summed absolute difference (SAD) value with reference to pixel values of the current field and the previous field;

calculating a second SAD value with reference to pixel values of the current field and the next field;

generating a detection pattern based on a result of a comparison of the first and second SAD values; and storing the detection pattern, comparing the stored detection pattern with a predetermined verification pattern, and determining whether the image signal is an image signal generated by a 2:2 pull-downs wherein the generating of the detection pattern comprises:

comparing magnitudes of the first and the second SAD values; and selectively outputting either a corresponding first value or second value based on a result of the comparison of the SAD comparator.

7. The image signal format detection method of claim 6, wherein when the first value is "0" the second value is"1".

8. The image signal format detection method of claim 6, wherein the storing the detection pattern and the comparing of the stored detection pattern comprises:

sequentially storing the detection pattern;

storing the predetermined verification pattern; and comparing a detection pattern stored in the pattern buffer and the verification pattern stored in the pattern storage.

9. The image signal format detection method of claim 8, wherein the predetermined verification pattern is a pattern having a predetermined repetition period according to the 2:2 pull-down.

10. The image signal format detection method of claim 6, wherein the detection pattern is a series.

11. A deinterlacing apparatus for converting an interlace scan mode image signal into a progressive scan mode image signal, comprising:

the format detection unit of claim 1;

a 2:2 pull-down compensation unit; and an interlace-to-progressive conversion unit, wherein the input image to the deinterlacing apparatus is selectively deinterlaced by the deinterlacing apparatus based either on the 2:2 pull-down compensation unit or the interlace-to-progressive conversion unit based on an output of the format detection unit.

12. A deinterlacing method for converting an interlace scan mode image signal into a progressive scan mode image signal, comprising outputting a deinterlaced image signal selectively based on interpolation values from either a 2:2 pull-down compensation operation or an interlace-to progressive conversion operation based on the image signal format detection method of claim 6.

13. A deinterlacing apparatus for converting an interlace scan mode image signal into a progressive scan mode image signal, comprising:

a format detection unit to detect a format of an input image based on a comparison of summed absolute difference values between fields of the input image;

a 2:2 pull-down compensation unit; and an interlace-to-progressive conversion unit, wherein the deinterlacing apparatus selectively deinterlaces the input image using interpolation output values from either the 2:2 pull-down compensation unit or the interlace-to-progressive conversion unit, based on an output of the format detection unit, wherein the comparison of the summed absolute difference values between fields of the input image is based on a comparison of the result of the following two equations:

$$\sum_{i=0}^{M-1}\sum_{j=0}^{N-1} |f_{n-1}(i,j) - f_n(i,j)|; \text{ and}$$

$$\sum_{i=0}^{M-1}\sum_{j=0}^{N-1} |f_n(i,j) - f_{n+1}(i,j)|,$$

wherein $f_{n-1}(i,j)$ denotes a value of a pixel at row i and column j in a previous field, $f_n(i,j)$ denotes a value of a pixel at row i and column j in a current field, and $f_{n+1}(i,j)$ denotes a value of a pixel at row i and column j in a next field, with M−1 and N−1 denoting maximum values of i and j, respectively, for an image of M×N size.

14. The deinterlacing apparatus of claim 13, wherein the interlace-to-progressive conversion unit performs an interpolation operation on the input image using a motion-compensated interpolation method.

15. The deinterlacing apparatus of claim 13, further comprising a multiplexer to output interpolation values of either the 2:2 pull-down or the interlace-to-progressive based on a pull-down mode signal output from the format detection unit.

* * * * *

UNITED STATES PATENT AND TRADEMARK OFFICE
CERTIFICATE OF CORRECTION

| | | |
|---|---|---|
| PATENT NO. | : 7,212,246 B2 | Page 1 of 1 |
| APPLICATION NO. | : 10/714605 | |
| DATED | : May 1, 2007 | |
| INVENTOR(S) | : You-young Jung et al. | |

It is certified that error appears in the above-identified patent and that said Letters Patent is hereby corrected as shown below:

Title Page, item [57] Column 2 (Abstract), Line 11, change "values,;" to --values,--.

Column 7, Line 15, change "claim 1" to --claim 1,--.

Column 7, Line 44, change "pull-downs" to --pull-down,--.

Column 8, Line 18-19, change "interlace-to progressive" to --interlace-to-progressive--.

Signed and Sealed this

Fourteenth Day of August, 2007

JON W. DUDAS
*Director of the United States Patent and Trademark Office*